United States Patent Office 3,679,557
Patented July 25, 1972

3,679,557
HEXAVALENT CHROMIUM REDUCTION
Patricia G. Gilby, Wilmington, Del., and William R. Heineman, Euclid, Ohio, assignors to Hercules Incorporated, Wilmington, Del.
No Drawing. Filed July 20, 1970, Ser. No. 56,649
Int. Cl. B01k 3/08; C01g 37/00; C02b 1/82
U.S. Cl. 204—97
6 Claims

ABSTRACT OF THE DISCLOSURE

Disclosed is an electrochemical process of reducing Cr(VI) to Cr(III) in aqueous solution. The pH of the solution is adjusted to about 1.5–3 and subjected to the action of an electrolytic cell by passing the solution through the cell and hence the cathode thereof. The cathode of the cell is made of an electrolytically conductive material, for instance carbon, having a high surface area per unit volume.

---

The present invention relates to a process for substantially completely reducing hexavalent chromium to trivalent chromium in aqueous solution, i.e. Cr(VI) to Cr(III). More particularly, the present invention relates to such a process whereby the reduction is carried out electrochemically by passing the aqueous solution through a conductive carbon cathode of an electrolytic cell. In a specific embodiment, the cathode, being made up of small particle size particles, provides a large surface area and thus gives the desired cathode-solution contact.

The present invention enables operating at pH values and solution flow rates substantially higher than heretofore feasible, both of which are very desirable. The prior art has not been able to operate above a pH of 1.5 and even at this pH the flow rate is considerably below that of the present invention. The present invention gives good results at a pH of 1.5–3, preferably 2–3. Thus contrary to the present invention prior art processes require an undesirably low pH before they obtain a satisfactorily high flow rate. At lower pH chromate reduction is not sufficiently economical to be practical because of the initial expense of acid plus the added expense of neutralizing the acid before the waste can be discharged.

Cr(VI) is toxic to life, including bioorganisms used in many waste treatment plants. In view of this, regulations have been established in many states requiring the reduction of Cr(VI) to a value not greater than 0.05 p.p.m. before discharging waste into natural streams and sewage systems. Thus a substantial need exists for an effective means of Cr(VI) reduction in waste effluent. This is especially a problem in cooling tower systems which use zinc chromate corrosion inhibitors since typical waste water therefrom (blowdown) usually contains 5–25 p.p.m. Cr(VI).

It has been found in accordance with the present invention that the ability to reduce Cr(VI) to Cr(III) by electrolysis is markedly enhanced by greatly increasing the surface area of the cathode and thereby optimizing the chances for Cr(VI) to interact with the cathode surface. This greatly enhanced surface area has been achieved with no increase in the volume of the electrolytic cell by employing the increased surface area of small conductive particles (preferably carbon). When stationary in a bed, such particles maintain good interparticle electrical contact, yet the bed is sufficiently porous to permit the passage of fluid therethrough.

The following examples illustrate various embodiments of the present invention. The examples are not intended to limit the present invention beyond the scope of the appended claims.

EXAMPLE 1

An electrolysis was performed on synthetic cooling tower water containing 13.5 p.p.m. Cr(VI). The solution was passed downward through an electrolytic cell at a rate of 25 ml./min. The level of hexavalent chromium was reduced to less than 0.05 p.p.m. Cr(VI) in a total of 300 liters of solution with a cumulative electrolysis time of 208 hours. After this time the process showed no signs of deterioration or loss of electrolytic capability. Carbon used for the bed electrode was obtained by fragmenting a block of Porous Carbon, Grade 60 (Union Carbide Corporation). The particle size used was that which passed through a 120 mesh and was held on a 140 mesh U.S. Standard sieve. It had a B-E-T surface area of 0.8 m.$^2$/gm. (see Table 3—footnote 3). The carbon in the electrolytic cell was not changed during the course of the electrolysis. The depth of the carbon bed electrode was 2 cm.; the diameter was 2 cm.; the weight was 6 g. The anode, a 30 gauge platinum wire spiralled at one end, was suspended with the spiral horizontal and 0.5 cm. above the top of the bed. The cell container was a modified R & H Filter Company 2040 20-mm. sealing tube with an extra coarse frit. Electrical contact with the carbon bed electrode was made with a 30 gauge platinum wire lead spot welded to a platinum mesh which was rested on the frit. The contact wire above the mesh was sheathed in 2-mm. O.D. poly(tetrafluoroethylene) tubing in order to prevent contact with the solution above the carbon bed electrode. A voltage of 5.5 v. was applied across the two electrodes, the carbon bed being the cathode. The pH of the synthetic cooling tower water was reduced to 2.7 with sulfuric acid prior to electrolysis. Effluent solution was analyzed for Cr(VI) with a colorimetric procedure using diphenylcarbazide as the color-forming reagent—see "Standard Methods for the Examination of Water and Waste Water," 12th ed., 123 (1965). This method is sensitive to 0.05 p.p.m. No detection by this method is considered complete removal of Cr(VI), and this is the meaning of "none detected" as disclosed herein. Ingredients of the simulated cooling tower water were as follows:

| | P.p.m. |
|---|---|
| $Al_2(SO_4)_3 \cdot 18H_2O$ | 65 |
| $CaCl_2 \cdot 2H_2O$ | 150 |
| $MgSO_4$ | 50 |
| $NaF$ | 10 |
| $Na_2SO_4$ | 300 |
| $NaCl$ | 180 |
| $Cr(VI)$ | 13.5 |
| $Zn^{2+}$ | 8 |

EXAMPLE 2

Example 1 was repeated with actual cooling tower water from an operating cooling tower. Initial chromate concentration was 13.5 p.p.m. Cr(VI). The amount of Cr(VI) was reduced to less than 0.05 p.p.m. Cr(VI) in the effluents. The process was sustained for 48 hours (62 liters electrolyzed) with no sign of deterioration in the ability to reduce chromate.

EXAMPLE 3

Several runs were carried out to determine the effect of pH on the amount of chromate removed. Electrolysis conditions were substantially identical with those described in Example 1 with the exception that pH of the solution before electrolysis was varied and flow rate was 29 ml./min. Further details appear in Table 1.

TABLE 1

Effect of pH variation on effluent Cr(VI) concentration

| pH: | Cr(VI) concentration, p.p.m. |
|---|---|
| 1.0 | None detected. |
| 1.5 | Do. |
| 2.7 | Do. |
| 2.8 | Do. |
| 2.9 | Do. |
| 3.0 | 1.8. |
| 3.1 | 6.7. |
| 3.7 | 7.9. |

An important condition of the present invention is the pH of the solution before passing into the electrolytic cell. The upper limit for rapid, continuous electrolysis is a pH of about 3. This limit is imposed by cathode fouling and reducing flow rate caused by retention of Cr(III) which is encountered above a pH of about 3. There is no lower pH limit except that based on economy. Usually it is economically unfeasible to operate at a pH below about 1.5. The reason for the lower pH limitation is fairly obvious, namely the initial expense of the acid and of the alkali required to raise the pH in order to discharge the effluent. Based on the foregoing, the pH range in accordance with the present invention is about 1.5–3, preferably about 2–3. In the pH range shown and using the improved cathode of the present invention, rapid electrolysis is achieved with substantially no fouling of the cathode. For a pH greater than about 3, the maximum flow rate with complete Cr(VI) reduction diminishes with time because of cathode fouling.

The influence of pH on electrolysis rate is shown in Table 2 hereinafter. Table 2 shows maximum flow rate possible with reduction of Cr(VI) to Cr(III) to below 0.05 p.p.m. Cr(VI) as a function of electrolysis time for a given carbon bed cathode.

TABLE 2 [1]

| Length of electrolysis time (hours) | Maximum flow rate with complete Cr(VI) reduction, ml./min. | | | | |
|---|---|---|---|---|---|
| | pH 3.5 | pH 3.0 | pH 2.7 | pH 2.4 | pH 1.5 |
| Immediately after starting | 2 | 12 | 28 | 55 | 90 |
| 25 | 1 | 12 | 28 | 55 | 90 |
| 50 | 1 | 12 | 28 | 55 | 90 |
| 100 | 1 | 12 | 28 | 55 | 90 |
| 150 | 1 | 12 | 28 | 55 | 90 |
| 200 | 1 | 12 | 28 | 55 | 90 |

[1] Conditions of Table 2:
- Voltage applied _____ 4.0 v.
- Electrode spacing _____ 0.2 cm.
- Cathode material _____ Porous carbon, Grade 60 (Union Carbide Corp.).
- Cathode thickness _____ 1 cm.
- Cathode particle size _____ Passes 80 mesh, retained on 100 mesh.[2]
- Cathode diameter _____ 2 cm.
- Original Cr(VI) concentration _____ 13.5 p.p.m. Cr(VI).
- Final Cr(VI) concentration _____ None detected.

[2] U.S. standard sieve sizes.

Another important condition of the present invention is a cathode having a large surface area. This enables high rates of reduction of Cr(VI) to Cr(III) by virtue of optimizing the chances for Cr(VI) to interact with the cathode surface and thus enabling high liquid flow rates. This also provides a cathode which has a considerably longer life and more resistance to fouling, e.g. from common soluble organic and inorganic additives and contaminants including flocculants and biocides. This greatly increased surface area of the cathode has been achieved with no increase in volume of the electrolytic cell by utilizing the increased surface area of small conductive particles. When stationary in a bed they maintained good interparticle electrical contact, yet the bed is sufficiently porous to permit rapid flow of liquid therethrough.

Satisfactory cathode materials include e.g. electrically conductive materials which are available in or can be converted to a form of high surface area per unit volume and are or can be made wettable by aqueous solutions. The preferred cathode materials include calcined cokes or other carbons (for instance the Porous Carbon Grade 60 used in the examples) which are commercially prepared from calcined cokes. Thus, Porous Carbon, Grade 60 is prepared by mixing calcined coke with a binder then molding and forming to remove volatiles. Of course, calcined coke is raw petroleum coke (i.e. the residue in the distillation of petroleum oil) which has undergone high temperature treatment (usually about 2100° F.) during which the carbon/hydrogen ratio markedly increases. Other preferred cathode materials include graphitized particles and fibers. Less preferred cathode materials include e.g. lamp blacks, chars, activated carbons and other carbons with electrical conductivity lower than those of the preferred materials.

It has been found in accordance with the present invention that certain characteristics of the electrolytic process should be within certain ranges in order to achieve a rapid electrolysis within the pH range of 1.5–3. Broadly operative ranges and preferred ranges are given in Table 3. These ranges are also discussed below.

TABLE 3.—ELECTROLYSIS CONDITIONS AT pH 1.5–3

| Characteristics | Broad | Preferred |
|---|---|---|
| Solution resistance [1] | <2,600 Ω-cm | <800 Ω-cm. |
| Carbon resistance [1] | <1,300 μΩ-cm | <800 μΩ-cm. |
| Electrode spacing [2] | 0.01–10 cm | 0.1–1 cm. |
| Cathode thickness | 0.1–10 cm | 0.5–4 cm. |
| Voltage applied | 2.2–20 v | 2.2–6 v. |
| Cathode surface area [3] | >0.1 m.²/gm | >0.5 m.²/gm. |
| Cathode particle size | Passes 10 mesh,[4] retained on 325 mesh. | Passes 35 mesh, retained on 100 mesh. |
| pH | 1.5–3 | 2–3. |

[1] Specific resistance (solution resistance, carbon resistance) is the resistance of a cylinder of material one centimeter in length and one square centimeter in cross-section in units of ohm-cm.
[2] The least distance between the anode and the cathode, i.e., the bottom of the anode and the top of the cathode bed for the cell.
[3] B-E-T surface area measurement, i.e., a specific surface area based on the adsorption of a gas on the surface and on the Brunauer-Emmett-Teller relationship, see J. Am. Chem. Soc. 60, 309 (1938); Anal. Chem. 30, 1387 (1958).
[4] U.S. standard sieve sizes.

Not exceeding the broad ohm-centimeter solution resistance (specific resistance) enables sufficient current to flow between electrodes for rapid Cr(VI) reduction. If the resistance of the solution is greater than the desired range it can be decreased by addition of a small amount of a soluble salt. Not exceeding the broad microhm-centimeter carbon resistance (specific resistance) for the carbon used for the cathode is also beneficial for the same reason. It is well known that the lower these values the better and that zero values are unobtainable because of the physical properties of the materials.

The minimum electrode spacing is the least distance which can conveniently be used without endangering the shorting of the electrodes. Distances in excess of the maximum result in large resistance between the electrodes causing slower electrolysis rates and bulky electrolytic cells.

Cathode thicknesses outside of the broad range offer no substantial improvement in the ability of an electrolytic cell to reduce Cr(VI).

The minimum applied voltage is determined by the voltage required to reduce Cr(VI) at the cathode as defined by thermodynamics. Voltages outside the broad range reduce current efficiency and generate hydrogen within the cathode. The optimum voltage for a given electrolytic cell depends on the values of the above discussed conditions.

The conductive carbon used as the cathode should have a B-E-T surface area of not less than about 0.1 m.²/gm. to provide sufficient contact with the ions in the aqueous solution to obtain rapid Cr(VI) reduction. The greater the surface area the better, consistent with providing a carbon with sufficient electrical conductivity. Calcining carbon to increase conductivity may cause a decrease in surface area.

The size of discrete particles should not be less than about 325 mesh to provide retention without clogging of the supporting surface, and should be no greater than about 10 mesh or effective contact with the aqueous phase will be reduced. A distribution of particle sizes is desirable since it maximizes the contact with the aqueous solution per unit volume of particulate cathode material.

Although it is preferred to use for the cathode a carbon in the form of small discrete particles (e.g. a powder) to give a large surface area without substantially increasing the size of the cell or impeding the passage of liquid through the carbon, there are other conductive carbon materials which have these desired characteristics and are therefore suitable. These other materials include e.g. (1) sheets or blocks of porous material through which the solution flows giving it contact with the surface within the pores, (2) conductive fibers such as graphite which are woven into cloth or converted into randomly oriented mats.

As indicated hereinbefore relatively nontoxic Cr(III) (to which toxic Cr(VI) is reduced in accordance with the present invention) may in most cases be discharged with the electrolytic effluent. In this event the electrolytic effluent before discharge needs only to be treated, as e.g. by adding a small amount of a base to increase the pH to about 6. However, if desired the Cr(III) can be removed readily by precipitating it as $Cr(OH)_3$ from the electrolytic effluent with a base to a pH of about 8, then filtering or settling.

While the present invention has been described hereinbefore mostly with reference to reducing Cr(VI) to Cr(III) in waste water, e.g. for cooling towers, it is applicable to any aqueous system wherein it is desired to reduce Cr(VI) or Cr(III). Aqueous waste systems other than cooling tower water include e.g. those of the metal processing industry (metal plating, pickling, electrochemical machining, electropolishing, etc.). Concentrations of Cr(VI) up to about 300 p.p.m. is common in effluents of the metal processing industry.

As will be seen from the foregoing, the electrolytic process of the present invention has several substantial advantages over prior art electrolytic processes. For instance it enables substantially increasing the rate of the reduction of Cr(VI) to Cr(III) at a solution pH up to about 3 (2.9 in Example 3) contrasted with the prior art upper pH of about 1.5. It also provides a substantially increased rate of reduction of Cr(VI) to Cr(III) per unit volume of electrolytic cell by virtue of employing a cathode having a high surface area per unit volume. Although the present invention is operable at pH values below 1.5, the rate of chromium reduction is substantially higher than prior art processes operated at the same pH due in large part to the use of the improved cathode hereof, for practical reasons one usually would operate the present process at a pH of about 1.5-3 (preferably about 2-3).

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of reducing Cr(VI) to Cr(III) in aqueous solution which comprises adjusting the pH of the solution to about 1.5-3 and subjecting the solution to the action of an electrolytic cell by passing the solution therethrough whereby the solution passes through the cathode of said cell, said cathode comprising a bed of carbon particles having a surface area of at least 0.1 square meter per gram and having a specific resistance of less than 1300 microhm-centimeters.

2. Process of reducing Cr(VI) to Cr(III) in aqueous solution which comprises adjusting the pH of the solution to about 1.5-3 and subjecting the solution to the action of an electrolytic cell by passing the solution therethrough whereby the solution passes through the cathode of said cell, said cathode comprising a bed of carbon particles having a surface area of at least 0.5 square meter per gram, and having a specific resistance of less than 1300 microhm-centimeters, and said aqueous solution having a specific resistance of less than 2600 ohm-centimeters.

3. Process of reducing Cr(VI) to Cr(III) in aqueous solution which comprises adjusting the pH of the solution to about 2-3 and subjecting the solution to the action of an electrolytic cell by passing the solution therethrough whereby the solution passes through the cathode of the cell, said cathode comprising a bed of carbon particles having a surface area of greater than 0.5 square meter per gram and having a specific resistance of less than 800 microhm-centimeters, and said aqueous solution having a specific resistance of less than 800 ohm-centimeters.

4. The process of claim 1 wherein the size of the carbon particles are not less than about 325 mesh nor greater than about 10 mesh.

5. The process of claim 2 wherein the size of the carbon particles are not less than about 325 mesh nor greater than about 10 mesh.

6. The process of claim 3 wherein the size of the carbon particles are not less than about 325 mesh nor greater than about 10 mesh.

References Cited

UNITED STATES PATENTS

| | | | |
|---|---|---|---|
| 1,448,036 | 3/1923 | Pearson et al. | 204—97 X |
| 3,124,520 | 3/1964 | Juda | 204—86 |
| 3,616,356 | 10/1971 | Roy | 204—152 |

FOREIGN PATENTS

| | | | |
|---|---|---|---|
| 826,153 | 10/1969 | Canada | 204—149 |
| 1,584,158 | 12/1969 | France | 204—149 |

FREDERICK C. EDMUNDSON, Primary Examiner

U.S. Cl. X.R.

204—294, 149, 152